US007320108B2

(12) United States Patent
Hough et al.

(10) Patent No.: US 7,320,108 B2
(45) Date of Patent: *Jan. 15, 2008

(54) METHOD FOR FLAGGING AND RELATING INFORMATION IN A COMPUTER SYSTEM

(75) Inventors: P. J. Hough, North Bend, WA (US); Thomas F. Begstraesser, Kirkland, WA (US); Jason D. Carlson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 570 days.

This patent is subject to a terminal disclaimer.

(21) Appl. No.: 10/996,650

(22) Filed: Nov. 24, 2004

(65) Prior Publication Data

US 2005/0144563 A1 Jun. 30, 2005

Related U.S. Application Data

(63) Continuation of application No. 10/803,381, filed on Mar. 18, 2004, which is a continuation of application No. 09/794,896, filed on Feb. 26, 2001, now Pat. No. 6,760,047.

(51) Int. Cl.
*G06F 13/00* (2006.01)
*G06F 15/00* (2006.01)
(52) U.S. Cl. ..................... 715/753; 715/758
(58) Field of Classification Search ............... 715/764, 715/751, 835, 810, 753, 758, 760, 738, 752
See application file for complete search history.

(56) References Cited

U.S. PATENT DOCUMENTS

| | | | |
|---|---|---|---|
| 5,848,424 A | 12/1998 | Scheinkman et al. | |
| 5,898,434 A * | 4/1999 | Small et al. | ............... 715/810 |
| 6,067,525 A | 5/2000 | Johnson et al. | |
| 6,081,263 A | 6/2000 | LeGall et al. | |
| 6,160,549 A | 12/2000 | Touma et al. | |
| 6,380,955 B1 * | 4/2002 | Kanungo et al. | ........... 715/764 |
| 6,385,595 B1 | 5/2002 | Kolling et al. | |
| 6,442,574 B1 | 8/2002 | Schumacher et al. | |
| 6,515,681 B1 * | 2/2003 | Knight | ...................... 715/751 |
| 6,760,047 B2 | 7/2004 | Hough et al. | |
| 2002/0091681 A1 | 7/2002 | Cras et al. | |

FOREIGN PATENT DOCUMENTS

WO  WO 97/24680 A1  7/1997

OTHER PUBLICATIONS

Anupam, V. et al., "Personalizing the Web Using Site Descriptions", *Database and Expert Systems Applications, IEEE Comput. Soc.*, 1999, 732-738, XP010352456.

(Continued)

*Primary Examiner*—Cao (Kevin) Nguyen
(74) *Attorney, Agent, or Firm*—Woodcock Washburn LLP

(57) ABSTRACT

This document describes a user interface mechanism to relate information from multiple heterogeneous data sources. Data displayed in different regions on a user interface can be related by selection of an element in one region and pinning it. The pinned element acts as a filter for the information in the other regions on the user interface. Successive pinning of elements in other regions allows further filtering of the information in unpinned regions using the context of previously pinned elements.

16 Claims, 11 Drawing Sheets

OTHER PUBLICATIONS

Takashi, S., "A Site Map for Visualizing both a Web Site's Structure and Keyboards", *IEEE*, 1999, 200-205, XP 010362696.

Tanzer, B.A., "Connecting Data Access Pages Together", http://msdn.microsoft.com/library/en-us/dnacc2k/html/conceptdap.asp?frame=true, Oct. 11, 2005, 1-8, XP 002349015.

* cited by examiner

| | Region1 | | | | | Region2 | | | | |
|---|---|---|---|---|---|---|---|---|---|---|
| publisher | | | | | book | | | | | |
| ≎ | publisher address | publisher city | publisher name | publisher state | ≎ | book type | description | price | publication date | title | year to date sale |
| | *München* *F1* München | München | GGG&G | | | popular_comp | A must-read for computer conferencing. | | 7/27/2000 2:07:54 AM | Net Etiquette | |
| | Paris | Paris | Lucerne Publishing | | | business | Helpful hints on how to use your electronic resources to the best advantage. | 11.95 | 6/9/1991 | Cooking with Computers; Surreptitious Balance Sheets | 3876 |
| P | Berkeley, CA | Berkeley | Algodata Infosystems | CA | | | | | | | |
| | Washington, DC | Washington | Binnet & Hardley | DC | | business | An overview of available database systems with emphasis on common business applications. Illustrated. | 19.99 | 6/12/1991 | The Busy Executive's Database Guide | 4095 |
| | Chicago, IL | Chicago | Five Lakes | IL | | | | | | | |
| author | | | | | | | | | | | |
| ≎ | author address | author city | author name | author state | phone number | | | | | | |
| | CA, 95128, 22 Cleveland Av. #14, San Jose | San Jose | Michael, O'Leary | CA | 408 286-2428 | | | | | | |
| | CA, 94612, 44 Upland Hts., Oakland | Oakland | Stearns, MacFeather | CA | 415 354-7128 | | business | Annotated analysis of what computers can do for you: a no-hype guide for the critical | 19.99 | 6/22/1991 | Straight Talk About Computers | 4095 |
| | CA, 94705, 589 Darwin Ln., Berkeley | Berkeley | Cheryl, Carson | CA | 415 548-7723 | | | | | | |
| | CA 94130 18 | | | | | | | | | | |

Region3

FIG. 5

Region1
Region2

| publisher | | | | |
|---|---|---|---|---|
| | publisher address | publisher city | publisher name | publisher state |
| *Flag F1* | München | | GGG&G | |
| | Paris | Paris | Lucerne Publishing | |
| P | Berkeley, CA | Berkeley | Algodata Infosystems | CA |
| | Washington, DC | Washington | Binnet & Hardley | DC |
| | Chicago, IL | Chicago | Five Lakes Publishing | IL |

| book | | | | | |
|---|---|---|---|---|---|
| | book type | description | price | publication date | title | year to date sale |
| | business | Helpful hints on how to use your electronic resources to the best advantage. | 11.95 | 6/9/1991 | Cooking with Computers: Surreptitious Balance Sheets | 3876 |

| author | | | | | |
|---|---|---|---|---|---|
| | author address | author city | author name | author state | phone number |
| | CA, 95128, 22 Cleveland Av. #14, San Jose | San Jose | Michael, O'Leary | CA | 408 286-2428 |
| P | CA, 94612, 44 Upland Hg., Oakland | Oakland | Stearns, MacFeather | CA | 415 354-7128 |
| | CA, 94705, 589 Darwin Ln., Berkeley | Berkeley | Cheryl, Carson | CA | 415 548-7723 |

*Flag F2*

Region3

FIG. 6

| | publisher address | publisher city | publisher name | publisher state |
|---|---|---|---|---|
| | München, | München | GGG&G | |
| | Paris, | Paris | Lucerne Publishing | |
| | Berkeley, CA | Berkeley | Algodata Infosystems | CA |
| Pin P1 | Washington, DC | Washington | Binnet & Hardley | DC |
| | Chicago, IL | Chicago | Five Lakes | IL |

METHOD FOR FLAGGING AND RELATING INFORMATION IN A COMPUTER SYSTEM

CROSS-REFERENCE TO RELATED APPLICATIONS

This application is a continuation of Application Ser. No. 10/803,381, entitled "Method For Flagging And Relating Information In A Computing System," filed Mar. 18, 2004 which is a continuation of Application Ser. No. 09/794,896, filed Feb. 26, 2001, entitled "Method For Flagging And Relating Information In A Computing System," now U.S. Pat. No. 6,760,047, both of which are herein incorporated by reference in their entirety.

FIELD OF THE INVENTION

This invention relates generally to a method and user interface mechanism to relate information from multiple heterogeneous data sources in a computer system.

BACKGROUND OF THE INVENTION

Information systems frequently consist of multiple heterogeneous data sources such as information repositories, financial and human resources systems, customer and sales tracking applications and the like. In this regard, enterprise decision makers often have to relate information from these multiple heterogeneous data sources in order to analyze a business situation and to act upon it. For example, a decision maker might wish to quickly know which of a set of employees not only has a background in aeronautical engineering but also has experience with aeronautical engineering company projects for the purpose of making a staffing decision for an important research and development project. Even with access to a multi-dimensional database of human resources information, a decision-maker may not know how to isolate such a subset of employees. For another example, a decision maker may wish to see a list of distributors that are distributing a particular enterprise product. In this case, with access to merely a database list of distributors and associated products, it may be difficult for a decision-maker to quickly isolate the distributors for a particular product.

Currently, to perform these types of data inquiries to display desired information, most decision support tools are based on a relational, multi-dimensional or similar representation. The analysis of information is performed through query execution with successive visualization of the results. However, this approach requires a deep understanding by the user of the operations that can be applied including an understanding of how data can be filtered and joined and an understanding of how to interpret the visualized results. For example, this type of process might include forming and typing queries with join and filter criteria in order to retrieve data from one or more data sources. This in turn requires a specialist to form the query, who understands the nature of the data source(s) and the nature of the query syntax. With respect to the examples given above, it may be necessary to employ a software engineer that understands database programming languages in order to isolate the list of employees for the aeronautical engineering staffing project or the list of distributors that distribute a particular product.

However, because analysis of business data and making decisions based on such an analysis is becoming more and more of a mainstream task in organizations, it is no longer desirable to restrict the performance of these types of tasks to a class of specialists with the technical skills necessary to perform the queries. Hence, there is a strong need for an easy and flexible way for decision makers to join and filter information from multiple data sources and to visualize the results without having to learn complex tools or query languages.

Computer systems that interact with the user commonly offer a user interface based on multiple windows that can represent applications or data. Windows can be opened, closed, moved, sized, juxtaposed and/or overlapped. Each window represents a region where information can be displayed.

The World Wide Web and hypertext pages have made the browser an important part of a user experience. A browser displays hypertext pages in a window most commonly written in HTML. Pages may include embedded components (regions) such as HTML frames, ActiveX controls, or Java applets, each of which occupy a part of the visible page and are able to display information independently.

Current browser-based user interfaces, such as Microsoft®'s Digital Dashboard, have taken this approach further by defining Web Parts in browser pages (Dashboards) in which information can be streamed independently. The user is able to arrange such Web Parts (regions) in a preferred layout. Essentially, instead of opening multiple instances of a browser, which a user may toggle among for viewing purposes, the Digital Dashboard enables the user to interact with multiple Web parts, browser windows or the like simultaneously as part of a unified user experience.

The user interface paradigms described above and similar approaches are based on defining individual regions on a user screen, each of which can display information. Each region can represent information from a different data source in a different format. FIG. 1A, for example, shows an example of the visualization of data from heterogeneous sources in different regions of a user interface. Region2, labeled "Customer," displays information from a database with customer related information. In a similar way, Region4, labeled "Geography," displays information about the geographical regions in which customers may reside. Region1 and Region3, labeled "Sales Cube" and "Sales Chart" respectively, display information coming from a multi-dimensional database. These regions may display information in different textual, multimedia or graphical representations. These regions may also be positioned fixed relative to each other or positioned individually by the user.

Thus, regions represent sets of information that can either be independent of each other or in a pre-computed relationship. In order for the user to easily join and filter information and to influence the relationship of information in the different regions in such a computer system, a user interface mechanism is needed.

One prior art system that addresses this need is U.S. Pat. No. 5,848,424, to Scheinkman et al. (the '424 patent). The '424 patent teaches an improved hypertext navigation system. A browser displays hypertext pages and indicates draggable elements on the page being viewed. The browser also displays drop targets and detects when a user selects a draggable element and drops the draggable element over a drop target. The browser and/or server to which it is connected examine a class relation matrix having entries for intersections of draggable element references and drop target references in which a matrix entry at an intersection of the draggable element and drop target is identified and used for performing an action which is a function of the matrix entry.

FIG. 1B generally illustrates the dragging aspect of the technique of the '424 patent in the context of the multiple data sources of FIG. 1A. In the example, draggable element DE1, labeled "Southern," can be dragged to drop target DT2, thereby causing the class relation matrix to be examined, and causing only Southern customer names (not shown) to be displayed in drop target zone DT2. However, this prior art technique suffers from a number of failings. For example, once draggable element DE1 is dropped into drop target DT2, it is impossible to tell from the information presented which draggable element(s) have been dropped into any particular drop target, such as DT2. Thus, in the example, it is not apparent from the information presented that DE1 was dropped into DT2, unless the user remembers which draggable element(s) were dragged to which drop target(s). While it might be simple enough to remember the dragging of a single draggable element DE1 to a single drop target DT2, the situation becomes much more complex when multiple draggable element(s) and/or multiple drop target(s) are considered. Thus, the '424 patent does not teach to convey the context of the information being presented, and thus after awhile, a user may no longer fully appreciate the context of the information being presented.

Furthermore, with the system taught by the '424 patent, there is no way to undrag a draggable element DE1 from a drop target DT2, once it has been dropped. While a user may reset the information being presented to its original state, to a time before any draggable elements were dragged, this is wholly inadequate as a solution to the inability to undrag a draggable element, except in the case of a single draggable element. It is wholly inadequate because in the case of multiple draggable elements having been dragged, the user may not undrag each draggable element one by one, for example, to 'zoom out' from the specificity of information shown.

Additionally, with the system taught by the '424 patent, there is no way to simultaneously affect all of the regions or drop targets with a single draggable element. To the contrary, only a single drop target may be affected by a dragged draggable element at a time. In other words, to affect all of the drop targets represented by a display, a user would be required to drag a draggable element to all of the drop targets, separately. In the example of FIG. 4B, a user would be required to drag draggable element DE1 to each of DT1, DT2 and DT3 in Region1, Region2 and Region3, respectively, with separate dragging actions in order to affect all of the available information with the draggable element DE1.

Thus, it would be desirable to provide a system in which a user can easily join and filter information, to influence the relationship of information in different regions of a display in a computer system. It would be further desirable to provide a simple and flexible user interface that achieves these goals. It would be still further desirable to provide a user interface mechanism that indicates the context of the information being joined and filtered on display. It would be advantageous to provide a user interface mechanism that allows a user to selectively join and unjoin and filter and unfilter the information being displayed. It would be further advantageous to provide a user interface mechanism that allows a user to simultaneously affect the information being displayed in all of the regions of the display, as opposed to a single region. It would be still further advantageous to provide a user interface mechanism that enables a user to select and/or pin an element contained in the region for the purpose of performing joining and/or filtering operations upon the information contained in the other regions of the display based upon the element selected and/or pinned.

SUMMARY OF THE INVENTION

The present invention provides a user interface mechanism to relate information from multiple heterogeneous data sources. Data displayed in different regions on a user interface can be related by selection of an element in one region and flagging it i.e., making the selection visible to user and storing information about the flagged element for relational purposes. The selection of the element may also itself flag the element. The flagged element acts as a filter for the information in the other regions of the user interface. Successive flagging of elements in other regions allows further filtering of the information in unflagged regions using the context of previously flagged elements. Elements may be flagged and unflagged freely by selecting and unflagging the element or by selecting a flagged element, thereby unflagging the element. In one embodiment, the flagging occurs by pinning the element, and unflagging occurs by unpinning the object.

Other features of the present invention are described below.

BRIEF DESCRIPTION OF THE DRAWINGS

The system and methods for relating information in a computer system are further described with reference to the accompanying drawings in which:

FIGS. 5 and 6 illustrate a user interface flagging mechanism in accordance with the present invention;

FIG. 10 illustrates an exemplary select and flag feedback mechanism in accordance with the present invention whereby a user is shown the context in accordance with previous flagging events.

DETAILED DESCRIPTION OF ILLUSTRATIVE EMBODIMENTS

Overview

In consideration of the above need for a system in which a user can easily join and filter information, to influence the relationship of information in different regions of a display in a computer system, the present invention has been developed. The present invention provides a simple and flexible user interface that indicates the context of the information being joined and filtered on display. The invention advantageously provides a user interface mechanism that allows a user to selectively join and unjoin and filter and unfilter the information being displayed. The invention advantageously provides a user interface mechanism that allows a user to simultaneously affect the information being displayed in all of the regions of the display, as opposed to a single region. The invention advantageously provides a user interface mechanism that enables a user to select and/or flag an element contained in the region for the purpose of performing joining and/or filtering operations upon the information contained in the other regions of the display based upon the element selected and/or flagged.

The user interface mechanism of the present invention allows a user to relate information from multiple heterogeneous data sources. Data displayed in different regions on a user interface can be related by selection of an element in one region and flagging it i.e., making the selection visible to user and storing information about the flagged element for relational purposes. The selection of the element may also itself flag the element. The flagged element acts as a filter for the information in the other regions of the user interface. Successive flagging of elements in other regions allows further filtering of the information in unflagged regions using the context of previously flagged elements. Elements may be flagged and unflagged freely by selecting and unflagging the element or by selecting a flagged element, thereby unflagging the element. In one embodiment, the flagging occurs by pinning the element, and unflagging occurs by unpinning the object.

Exemplary Computer and Network Environments

Figure 1A:
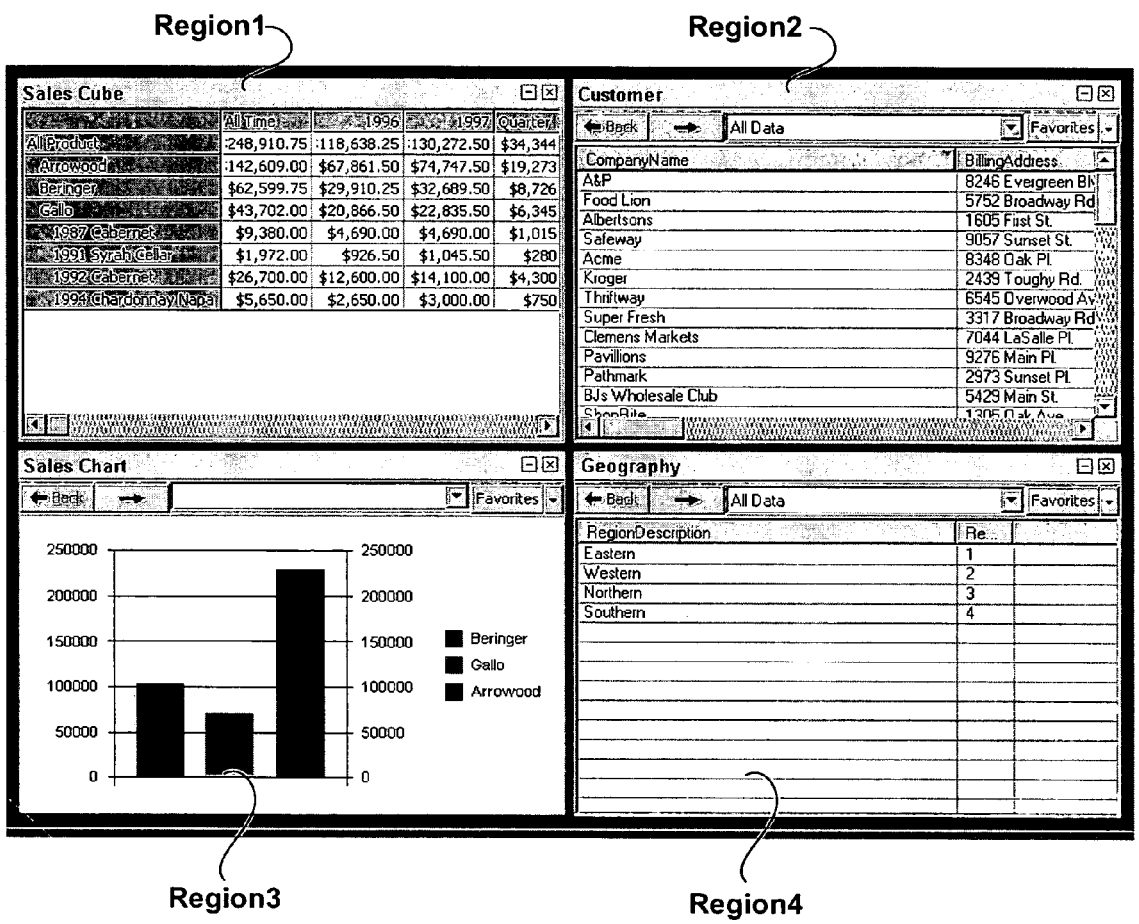
FIG. 1A represents an exemplary display of information in multiple regions from multiple heterogeneous data source(s)
Figure 1B:
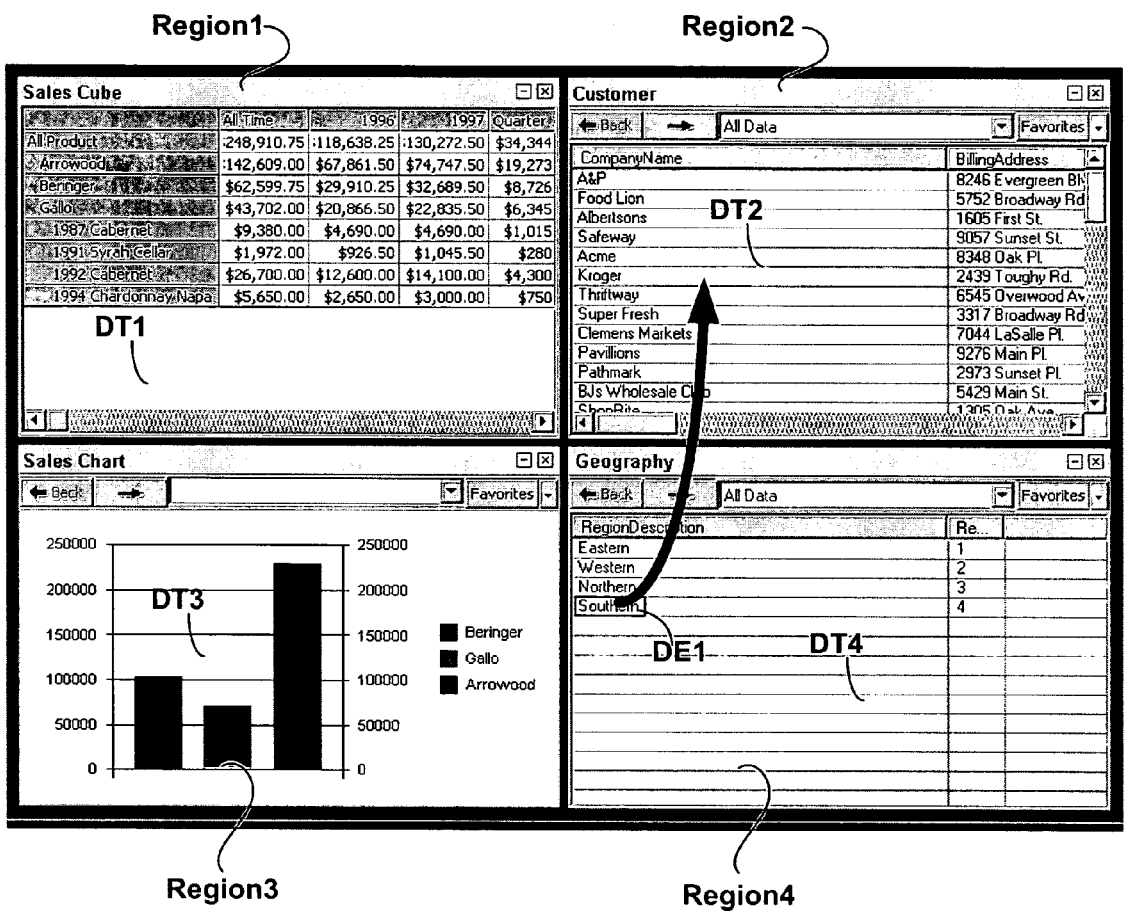
FIG. 1B represents a prior art technique wherein a draggable element is dragged to a drop target for the purpose of relating the draggable element to the information displayed in the drop target.
Figure 2:
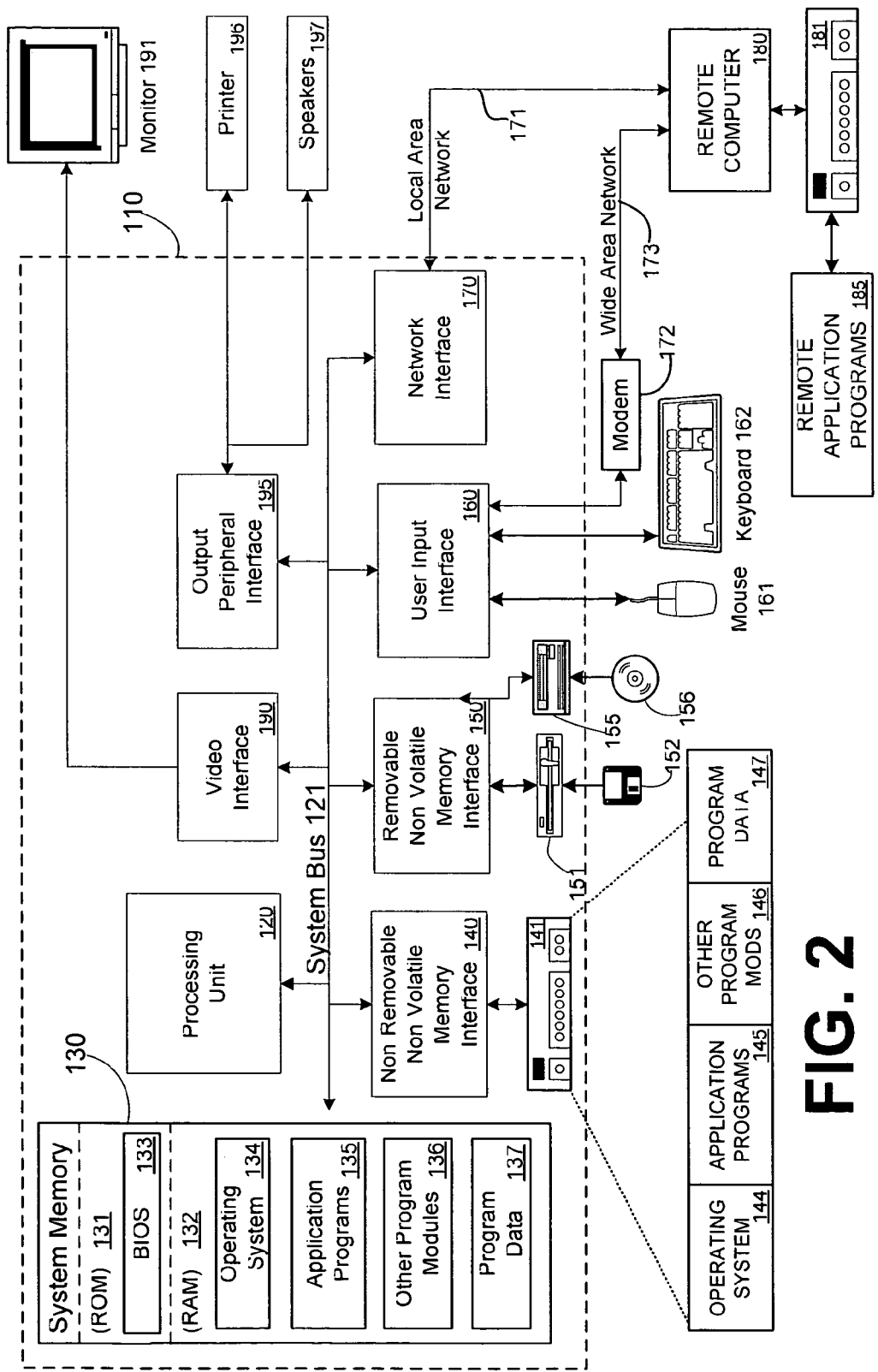
FIG. 2 is a block diagram representing a suitable computing system environment in which the present invention may be implemented.

FIG. 2 and the following discussion are intended to provide a brief general description of a suitable computing environment in which the invention may be implemented. It should be understood, however, that handheld, portable and other computing devices of all kinds are contemplated for use in connection with the present invention. While a general purpose computer is described below, this is but one example, and the present invention requires only a way of rendering information for different regions, such as a display via a browser, wherever retrieved. Additionally, the present invention may be implemented in an environment of networked hosted services in which very little or minimal client resources are implicated, e.g., a networked environment in which the client device serves merely as a browser or interface to the World Wide Web.

Although not required, the invention will be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 2 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2 provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

As mentioned, a computer 110, such as described above, or other client device can be deployed as part of a computer network. Further, the present invention pertains to any computer system having any number of memory or storage units, and any number of applications and processes occurring across any number of storage units or volumes; Thus, the present invention may apply to both server computers and client computers deployed in a network environment, having remote or local storage.

Figure 3:
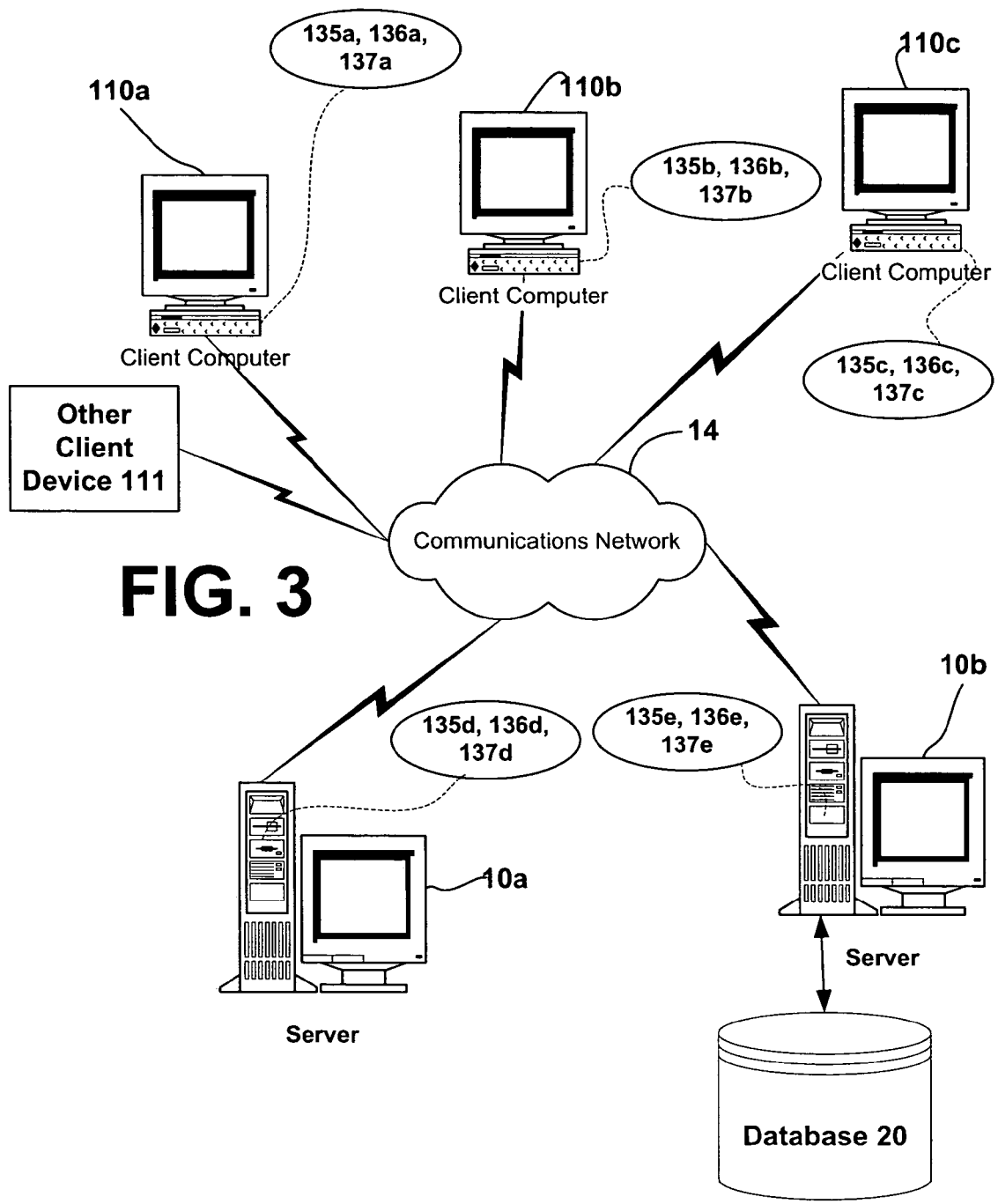
FIG. 3 is a block diagram representing an exemplary network environment in which the present invention may be implemented.

FIG. 3 illustrates an exemplary network environment, with a server in communication with client computers via a network, in which the present invention may be employed. As shown, a number of servers 10a, 10b, etc., are interconnected via a communications network 14 (which may be a LAN, WAN, intranet or the Internet) with a number of client computers 110a, 110b, 110c or other client devices 111, such as a portable computer, handheld computer, thin client, network appliance, etc. In a network environment in which the communications network 14 is the Internet, for example, the servers 10 can be Web servers with which the clients 110a, 110b, 111, etc. communicate via any of a number of known protocols such as hypertext transfer protocol (HTTP). Communications may be wireless, where appropriate. Each client computer 110 and server computer 10 may be equipped with various application program modules 135, other program modules 136 and program data 137, and with connections or access to various types of storage elements or objects, across which files may be stored or to which portion(s) of files may be downloaded or migrated. Any server 10a, 10b, etc. may be responsible for the maintenance and updating of a database 20 in accordance with the present invention. Thus, the present invention can be utilized in a computer network environment having client computers 110a, 110b, etc. for accessing and interacting with a computer network and server computers 10a, 10b, etc. for interacting with client computers 110a, 110b, etc. and databases 20.

Select and Flag User Interface Mechanism

In accordance with the present invention, select and flag is a user interface mechanism utilized to relate information in different regions of a computer display. A region displays information in the form of selectable elements, while a selectable element may be a text string, a graphic, or any other element that can be selected using a mouse, keyboard or other user input device.

An element is flagged either by selecting it implicitly, clicking on it, or by a successive user action such as selecting a flag operation from a pop-up menu. Flagging an element activates software services that may reside on the client or on a server that notifies the other regions of the flag operation as well as the element that was flagged. The other regions relate the flagged element to the information that the regions represent based on receiving this notification. The operation of relating the selected element with the information represented by a region may include joins, filtering, and other like operations on the data source(s). The act of selecting may itself be sufficient to effect flagging of the element, or flagging may be an additional step beyond selecting.

The result of the select and flag operation is that one or more regions may change their display of information to show new information related to the flagged element, depending upon the new context created by selecting and flagging the element. Both which regions are notified and how the regions are related are defined as part of the individual regions and how they are grouped into the particular application for the type of user implicated.

Figure 4:
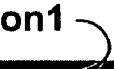
FIG. 4 is an exemplary screen displaying three regions containing information from heterogeneous data source(s) representing publisher, book and author information, respectively.

FIG. 4 shows an exemplary screen display for a select and flag operation that relates information displayed in multiple regions.

The screen display shows information in a book-publishing database. Region1 labeled "Publisher" shows all the publishers, Region3 labeled "Author" shows all the authors, and Region2 labeled "Books" shows all the books in the database. None of the information currently is flagged as taught by the present invention.

FIG. 5 shows the result of a select and flag operation in which the user, by flagging an element in Region1 with flag F1, has related the element to information displayed in other regions. A publisher element ("Algodata Infosystems") has been flagged with flag F1 in Region1. The flag F1 tells the user that this publisher constitutes the context for the other regions. Region3, therefore, shows only elements reflecting authors who have books published by the flagged publisher and Region2 shows only books published by the flagged publisher.

FIG. 6 illustrates the result of two select and/or flag operations, showing flags F1 and F2. These operations result in elements in two regions, Region1 and Region3, setting the context for a third region, Region2.

An author element from the Author region ("Stearns, MacFeather") that was displayed as a result of the previous flag operation with flag F1, has additionally been flagged with flag F2. This results in a display of all books, in Region3 labeled "Books", that have been published by the flagged publisher and written by the flagged author. It can be appreciated that in this embodiment, the regions that have flagged elements in them do not change, although arrangements having regions with flagged elements that can also change are also feasible.

As mentioned, select and flag is a user interface mechanism utilized to relate information displayed in different regions of a computer display. In one embodiment, the method includes a display screen that is arranged into two or more regions, with the regions displaying any number of user selectable elements. The method may include a mechanism to detect that a user has selected an element in a specific region. The method may include a mechanism to flag a selected element. This flagging mechanism could be combined with the selecting of the element. The method may include a mechanism to communicate the flag event and the flagged element to one or more regions. The method may include a mechanism to relate the selected element with the information represented by a region and one or more previously flagged elements. Additionally, the method may include a mechanism to display the result of the relate operation in the affected region.

Flagging an element thus defines a context for the content displayed in other regions. In order to visualize this relationship, select and flag offers a user interface feedback mechanism by marking the selected and/or flagged element. It also provides additional services to unflag flagged elements.

The feedback mechanism may include an optional mechanism to highlight a selected element. The feedback mechanism may include a mechanism to mark a flagged element so that the flagged state is visible to the user. The feedback mechanism may include a mechanism to unflag a flagged element. The feedback mechanism may include a notification mechanism that notified other regions of an unflag operation.

The described method can be implemented using a variety of different technical architectures including both server and client side execution. It may be implemented in code or generated from meta descriptions. The following exemplifies one of the possible implementation technologies.

As related in the background, a digital dashboard is a framework to build and deploy personalized portals that aggregate personal, team, corporate, and external information and services with single-click access to business intelligence and knowledge management functionality.

Figure 7:
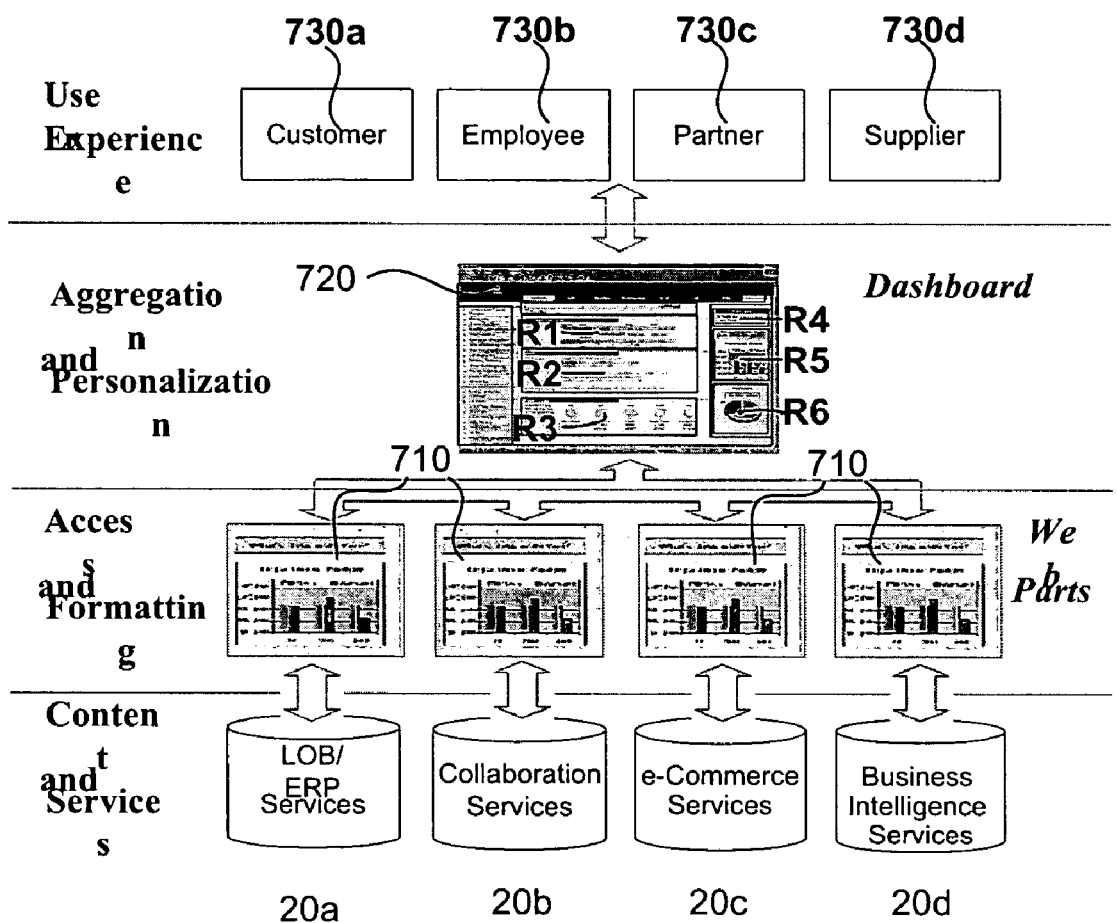
FIG. 7 illustrates a view of the overall architecture of the use of a digital dashboard in accordance with exemplary embodiments of the present invention.

FIG. 7 shows the basic components of a digital dashboard user interface 720. Information and services from databases or servers 20a through 20d (or other data sources) are represented in the digital dashboard through reusable Web Parts 710. Web Parts 710 act as channels for accessing information or services on backend servers, specify formatting, and delivering it to a client computer, so that users such as a customer 730a, employee 730b, partner 730c, supplier 730d or others can access the information and perform the select and flag operations of the present invention.

Web parts 710 can operate as regions, e.g. regions R1 through R6, as described in the select and flag mechanism described above. Web parts 710, through regions R1 to R6, may act as the display for information emanating from different data sources 20a through 20d. The digital dashboard 720 offers the infrastructure mechanism(s) for Web parts 710 to communicate with each other through notifications and shared session state.

Figure 8:
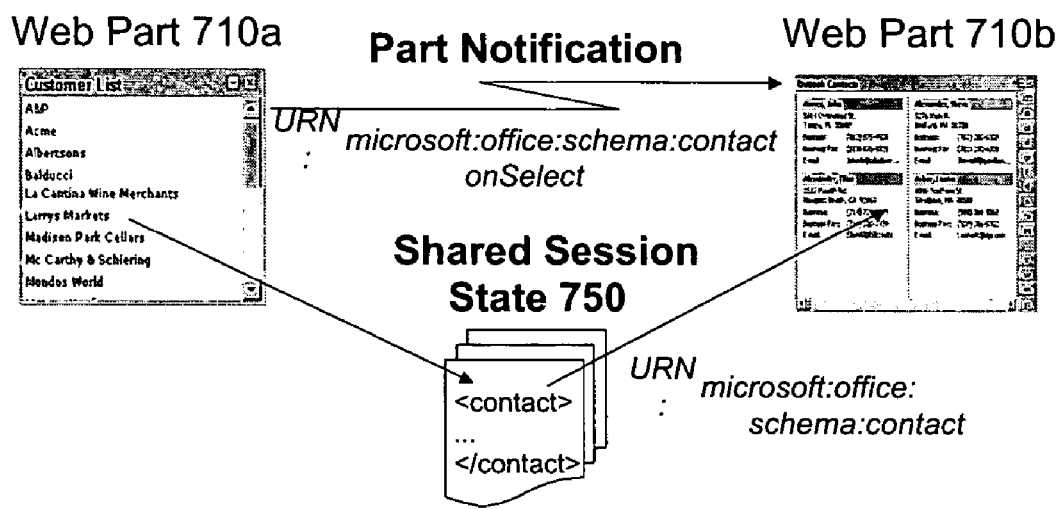
FIG. 8 illustrates an exemplary Web part communication after an element is flagged in accordance with the present invention.

In the context of an exemplary digital dashboard implementation, FIG. 8 shows a Web part communication mechanism illustrating Web part notification and a shared session state. The Web part communication mechanism provides a platform for the implementation of select and flag in a browser. Flagging an element in Web part 710a places the information represented by the element in the shared session state 750 and raises an event that notifies other Web parts, such as Web part 710b, of the flag operation. The other Web parts are able to retrieve the shared session state and relate the element to the information they represent. In one embodiment of the invention, all of the Web parts 710 are notified of the flagging operation. Those Web parts 710 without flagged elements are affected by the flagging operation. In another embodiment, only those Web parts 710 without flagged elements are notified, which may be kept-track of as part of the shared session state 750.

Relating one or more flagged elements to the information represented by a Web part is a join, filter, or similar operation on data from data source(s) that is performed automatically in accordance with the present invention, and does not require the skills of a knowledgeable database engineer. In the embodiment shown, XML is utilized in connection with the Web part communication mechanism, although any format suited to the delivery of information would suffice.

Figure 9:
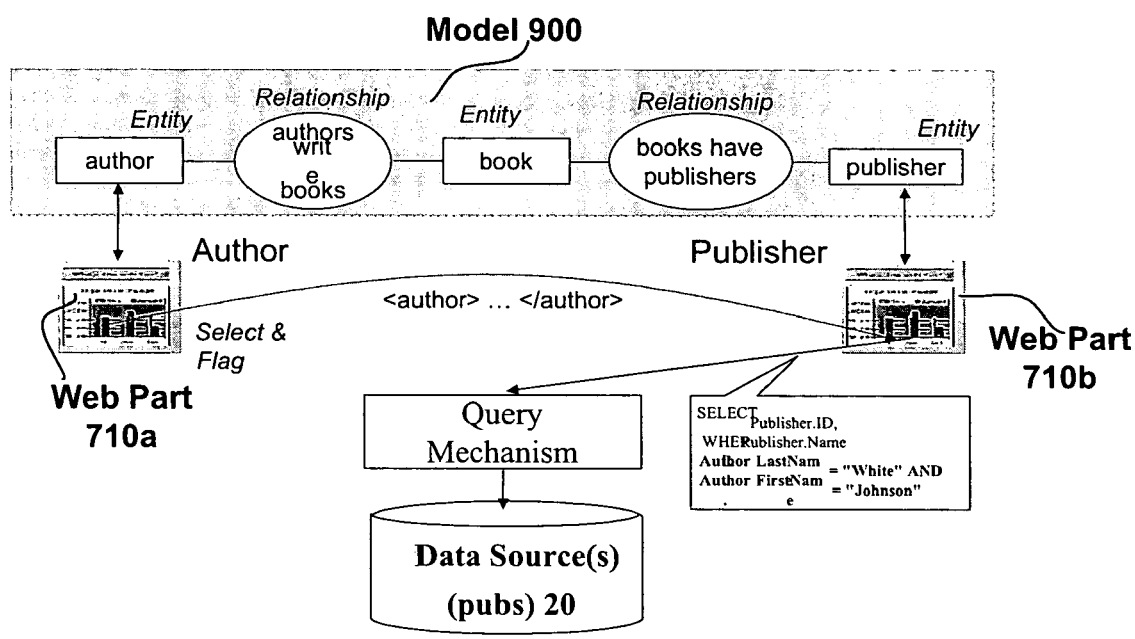
FIG. 9 illustrates conceptually the relation of information in accordance with the present invention.

FIG. 9 shows an example for an underlying query mechanism that can relate information based on SQL-like queries.

Web parts 710, which in this example serve as the regions of select and flag operations, can retrieve their contained information through queries. The queries are executed against the respective data sources 20 and the results are displayed as user selectable elements. Flagging an element activates the Web part notification mechanism and communicates the selected element to one or more other Web parts 710b that listen for the notification. The receiving Web part 710b retrieves the selected element and uses it to construct joins or filter conditions for its query. The new query is passed to the underlying query mechanism and the results are displayed as Web part information.

In the example above, a flag operation of an author in the Author Web part 710a causes the Publisher Web part 710b to recompute its query to show all publishers that have a transitive relationship in the database to the specific author. The relationship between authors, books and publishers is maintained as part of a model 900.

As mentioned, the feedback mechanism for the select and flag is integrated into the Web parts 710 as a standard user interface mechanism of the Digital Dashboard, whereby a user is informed of the context for the display of data by the visibility of the flags.

FIG. 10 shows a Web part 710 with the feedback mechanism marked. Selecting an element in the Web part 710 (row) highlights the element. Clicking the element flags the element. In this embodiment, the flagged state is indicated by a pin image P1 in the reserved column on the left side of the Web part 710. It should be understood that a pinning mechanism is merely one implementation of a flagging mechanism, and any type of flagging mechanism is contemplated. The top part of the column also serves as a place to hold the Unflag or unpin function. Clicking Unflag or unpin will automatically remove the pin and notify all other parts that nothing is flagged or pinned anymore, i.e. that the regions should revert the displayed content to its unrelated state.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations. As related above, the invention is not restricted to a personal computing environment, but rather may be implemented in the context of client services delivered via a networked server, wherein a user interface, such as a browser enables the display of application data. Furthermore, the data displayed via such a user interface may be retrieved from local or remote storage, delivered via an application or service, or entered by a user.

The methods and apparatus of the present invention may also be embodied in the form of program code that is transmitted over some transmission medium, such as over electrical wiring or cabling, through fiber optics, or via any other form of transmission, such as wireless transmission wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the flagging and information relation functionality of the present invention. For example, the storage techniques used in connection with the present invention may invariably be a combination of hardware and software.

While the present invention has been described in connection with the preferred embodiments of the various Figures, it is to be understood that other similar embodiments may be used or modifications and additions may be made to the described embodiment for performing the same function of the present invention without deviating therefrom.

Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed is:

1. A computer-readable medium having computer-executable instructions for interfacing with a computer display wherein the display comprises a plurality of regions, with each region displaying information associated with at least one of (1) at least one data source and (2) user entered data, the computer-executable instructions performing:

flagging an element in a first region; and altering the information displayed in at least one region, different from said first region, based upon said flagged element, wherein said altering includes:

communicating said flagging and said flagged element to at least one of said plurality of regions, different from said first region, relating said flagged element with the information represented by said at least one of said plurality of regions, different from said first region, and displaying the result of the relating operation in the at least one of said plurality of regions, different from said first region.

2. The computer-readable medium of claim 1, wherein said plurality of regions are a plurality of Web parts.

3. The computer-readable medium of claim 1, wherein said display is a browser display displaying said plurality of regions.

4. The computer-readable medium of claim 1, wherein said information displayed by each region is transmitted via hyper text transfer protocol.

5. The computer-readable medium of claim 1, wherein said altering includes filtering at least one of (1) the at least one data source associated with said at least one region and (2) the information displayed in said at least one region.

6. The computer-readable medium of claim 1, wherein said altering includes joining at least one of (1) the at least one data source associated with said at least one region and (2) the information displayed in said at least one region.

7. The computer-readable medium of claim 1, wherein said flagging includes selecting said element in said first region.

8. The computer-readable medium of claim 1, the computer-executable instructions performing selecting said element before said flagging.

9. The computer-readable medium of claim 1, the computer-executable instructions performing unflagging said element.

10. The computer-readable medium of claim 9, wherein unflagging said element alters the information displayed in said at least one region, different from said first region, to information displayed without the influence of said element.

11. The computer-readable medium of claim 9, wherein said unflagging includes unpinning said element.

12. The computer-readable medium of claim 9, wherein unflagging said element restores the information displayed in said at least one region, different from said first region, to the information displayed before flagging said element.

13. The computer-readable medium of claim 1, wherein said flagging includes pinning said element.

14. The computer-readable medium of claim 1, wherein the flagged element indicates the context for the alteration of information in regions not having a flagged element.

15. The computer-readable medium of claim 1, wherein said altering of the information consists of altering information displayed in all of said plurality of regions, different from said first region, based upon said flagged element.

16. The computer-readable medium of claim 1, wherein said altering of the information consists of altering information displayed in a second region, different from said first region, only if said second region has no flagged element associated therewith.

* * * * *